(12) United States Patent
He et al.

(10) Patent No.: US 10,929,887 B2
(45) Date of Patent: Feb. 23, 2021

(54) MOBILE ADVERTISEMENT SYSTEMS AND METHODS OF USING THE SAME

(71) Applicants: David Quan He, Johns Creek, GA (US); Ming Jiang, Alpharetta, GA (US)

(72) Inventors: David Quan He, Johns Creek, GA (US); Ming Jiang, Alpharetta, GA (US)

(73) Assignees: David Q. He, Johns Creek, GA (US); Ming Jiang, Alpharetta, GA (US)

( * ) Notice: Subject to any disclaimer, the term of this patent is extended or adjusted under 35 U.S.C. 154(b) by 397 days.

(21) Appl. No.: 15/657,196

(22) Filed: Jul. 23, 2017

(65) Prior Publication Data
US 2019/0026780 A1     Jan. 24, 2019

(51) Int. Cl.
*G06Q 30/02* (2012.01)
*H04W 4/02* (2018.01)
*H04W 4/21* (2018.01)

(52) U.S. Cl.
CPC ..... *G06Q 30/0267* (2013.01); *G06Q 30/0241* (2013.01); *G06Q 30/0261* (2013.01); *H04W 4/026* (2013.01); *H04W 4/21* (2018.02)

(58) Field of Classification Search
CPC .................................................. G06Q 30/0267
USPC ....................................................... 705/14.64
See application file for complete search history.

(56) References Cited

U.S. PATENT DOCUMENTS

| 9,775,003 B2* | 9/2017 | Ciecko | H04W 4/029 |
| 10,416,947 B2* | 9/2019 | Zenoff | G09G 3/32 |
| 2010/0250368 A1* | 9/2010 | Porco | G06Q 30/0241 |
| | | | 705/14.58 |
| 2012/0131170 A1* | 5/2012 | Spat | H04L 67/04 |
| | | | 709/223 |

(Continued)

OTHER PUBLICATIONS

European Search Report: by Christina Falierou, dated Oct. 6, 2017.
(Continued)

*Primary Examiner* — Azam A Ansari
(74) *Attorney, Agent, or Firm* — Ming Jiang; MM IP Services LLC

(57) ABSTRACT

The present disclosure relates to a mobile advertisement system and a method of advertisement using the mobile advertisement system. In certain embodiments, mobile advertisement system includes: a mobile advertisement server and one or more mobile advertisement delivery systems. The mobile advertisement server registers many advertisers and subscribers, receives various advertisements and their corresponding delivery instructions from advertisers, and dispatch advertisements and delivery instructions to the subscribers. Each of mobile advertisement delivery systems corresponds to one of registered subscribers, and is connected to mobile advertisement server. Each mobile advertisement delivery systems receive advertisements and delivery instructions from mobile advertisement server, and displays advertisements on respective mobile advertisement display device according to corresponding delivery instructions. Each delivery instruction corresponds to an advertise- (Continued)

ment, and includes: delivery time and delivery location. Each mobile advertisement delivery systems displays advertisements when it is positioned in a region specified by delivery location and during delivery time.

20 Claims, 6 Drawing Sheets

(56) References Cited

U.S. PATENT DOCUMENTS

2014/0040016 A1* 2/2014 Amla ................. G06Q 30/0267
705/14.45

OTHER PUBLICATIONS

U.S. Appl. No. 15/644,818, entitled "Mobile Media Delivery System and Methods of Using the Same", filed Jul. 9, 2017, by David Quan He, and Ming Jiang.
U.S. Appl. No. 15/644,820, entitled "Mobile Media Delivery System and Methods of Using the Same", filed Jul. 9, 2017, by David Quan He, and Ming Jiang.
U.S. Appl. No. 15/702,701, entitled "In-Vehicle Advertisement Display Systems for Mobile Advertisement Systems", filed Sep. 12, 2017, by Ming Jiang, and David Quan He.

* cited by examiner

MOBILE ADVERTISEMENT SYSTEMS AND METHODS OF USING THE SAME

FIELD

The present disclosure generally relates to advertisement, and more particularly to mobile advertisement systems and methods of mobile advertisement using the mobile advertisement systems.

BACKGROUND

Typical commercial information display includes displays of various type of advertisements. Such advertisements can be seen on billboards along roadsides, posters displayed in store fronts, or sometimes carried on moving vehicles. Most of these advertisements have fixed contents, and are displayed in fixed locations. Therefore, conventional advertisement is limited by the fixed contents and/or fixed location.

Therefore, an unaddressed need exists in the art to address the aforementioned deficiencies and inadequacies.

SUMMARY

In one aspect, the present disclosure relates to a mobile advertisement system. In certain embodiments, the mobile advertisement system includes: a mobile advertisement server, and one or more mobile advertisement delivery systems. Each of the mobile advertisement delivery systems corresponds to a mobile advertisement participant, also known as a subscriber. Each of the mobile advertisement delivery systems is connected to the mobile advertisement server over a network. The mobile advertisement server is used to register many advertisers, and many subscribers, receive various advertisements and their corresponding delivery instructions from the advertisers, receive Global Positioning System (GPS) location updates in a predetermined interval from each of the mobile advertisement delivery systems, and dispatch the advertisements and the corresponding delivery instructions to each of the mobile advertisement delivery systems through the network.

In certain embodiments, each of the mobile advertisement delivery systems sends its GPS location updates in the predetermined interval to the mobile advertisement server, receives the advertisements and the delivery instructions from the mobile advertisement server in response to the GPS location updates sent, and displays the advertisements on a mobile advertisement display device according to the corresponding delivery instructions. Each of the delivery instructions corresponds to one of the advertisements, and each of the delivery instructions includes: an advertisement delivery time period and an advertisement delivery location information. Each of the mobile advertisement delivery systems displays the advertisements when the mobile advertisement delivery system is positioned in a region specified by the advertisement delivery location information and during the advertisement delivery time period.

In another aspect, the present disclosure relates to a method of using a mobile advertisement server of a mobile advertisement system. The method includes: establishing network communication to a mobile advertisement database and one or more mobile advertisement delivery systems over a network through a network communication module and a network interface controller, registering one or more advertisers by these advertisers via a user interface module, and storing advertiser information into the mobile advertisement database, registering one or more subscribers by these subscribers via the user interface module, and storing subscriber information into the mobile advertisement database. Each of the subscribers corresponds to at least one of the mobile advertisement delivery systems. The method also includes: receiving one or more advertisements and corresponding delivery instructions from the advertisers, and storing advertisement information into the mobile advertisement database, receiving GPS location updates in the predetermined interval from each of the mobile advertisement delivery systems, and storing the GPS location updates in the mobile advertisement database, dispatching the advertisements and the delivery instructions to the mobile advertisement delivery systems operating in a region according to the delivery instructions, and receiving delivery confirmations from each of mobile advertisement delivery system and storing the delivery confirmations received in the mobile advertisement database.

In yet another aspect, the present disclosure relates to a method of mobile advertisement using a mobile advertisement delivery system of a mobile advertisement system. In certain embodiments, the method includes: establishing network communication between the mobile advertisement delivery system to a mobile advertisement server over a network, sending GPS location updates of the mobile advertisement delivery system to the mobile advertisement server in the predetermined interval over the network, receiving one or more advertisements and corresponding delivery instructions from the mobile advertisement server in response to the GPS location updates sent over the network, storing the advertisements and the delivery instructions received in a local data storage, and displaying the advertisements on a mobile advertisement display device according to the delivery instructions.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein.

DETAILED DESCRIPTION

Figure 1:
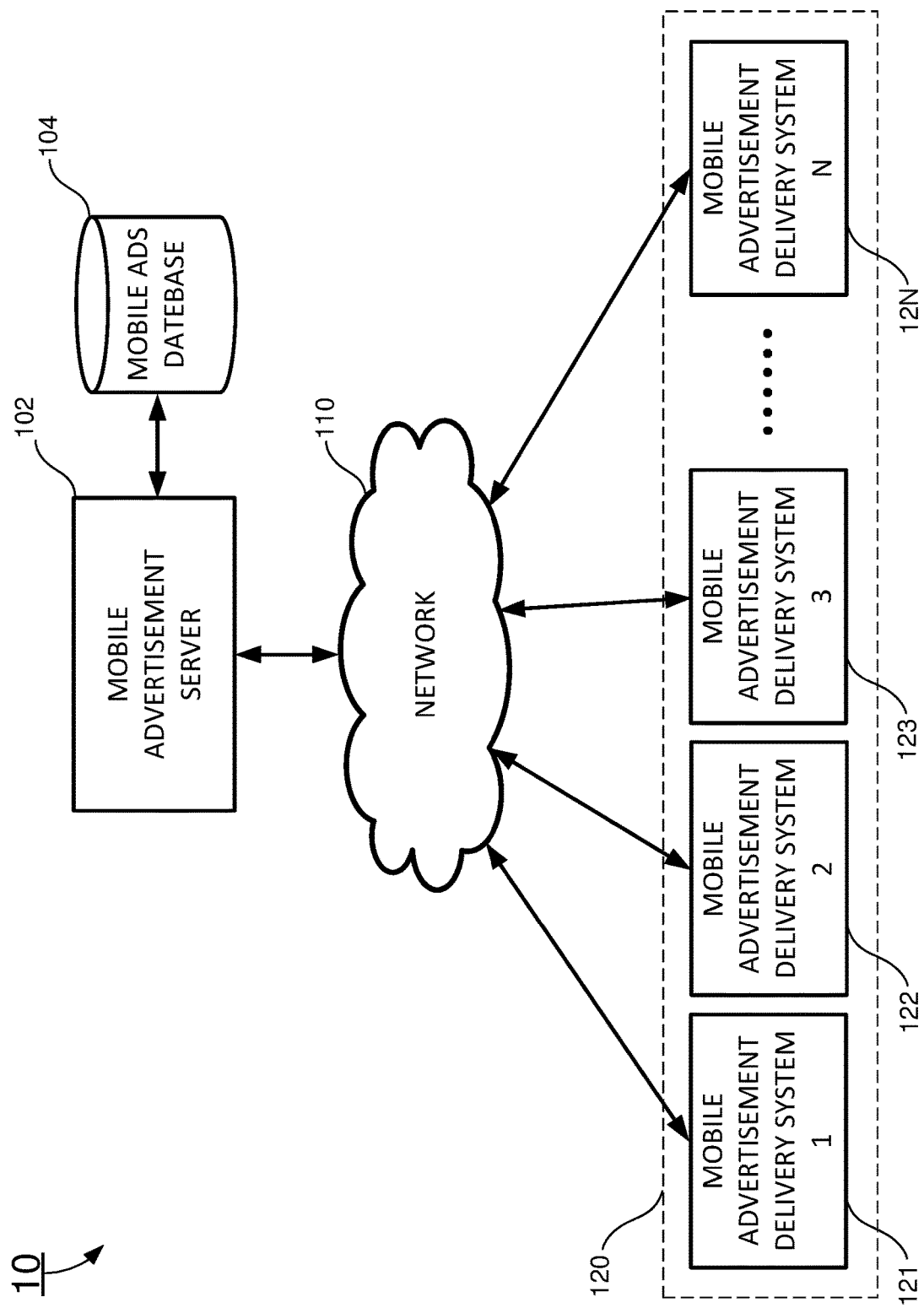
FIG. 1 shows a block diagram of a mobile advertisement system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The description will be made as to the embodiments of the present disclosure in conjunction with the accompanying drawings FIGS. 1 through 6.

Referring now to FIG. 1, in one aspect, the present disclosure relates to a mobile advertisement system 10. In certain embodiments, the mobile advertisement system 10 includes: a mobile advertisement server 102, and N mobile advertisement delivery systems 120: a first mobile advertisement delivery system 121, a second mobile advertisement delivery system 122, a third mobile advertisement delivery system 123, . . . , and a N-th mobile advertisement delivery system 12N, where N is a positive integer. Each of the mobile advertisement delivery systems 120 corresponds to at least one mobile advertisement participant, also known as a subscriber. Each of the mobile advertisement delivery systems 120 is connected to the mobile advertisement server 102 over a network 110.

In certain embodiments, the mobile advertisement server 102 is used to register many advertisers and many subscribers, receive various advertisements and their corresponding delivery instructions from the advertisers, receive GPS location updates in a predetermined interval from each of the mobile advertisement delivery systems 120, and dispatch the advertisements and the corresponding delivery instructions to each of the mobile advertisement delivery systems 120 through the network 110. The network 110 may be a wireless network. The network 110 includes the internet, a wireless network, mobile communication network, Wi-Fi network, Zigbee personal area network, and Bluetooth network. The mobile advertisement server 102 manages operations of the mobile advertisement system 10, including the operations of the N mobile advertisement delivery systems 120.

In certain embodiments, each of the mobile advertisement delivery systems 120 sends its GPS location updates in the predetermined interval to the mobile advertisement server 102, receives the advertisements and the delivery instructions from the mobile advertisement server 102 in response to the GPS location updates sent, and displays the advertisements on a respective mobile advertisement display device 128 according to the corresponding delivery instructions.

In certain embodiments, each of the advertisements includes: one or more banners, one or more digital images, one or more messages in text form, one or more animations, and one or more videos. Each of the delivery instructions corresponds to one of the advertisements, and each of the delivery instructions includes: an advertisement delivery time period and an advertisement delivery location information. Each of the mobile advertisement delivery systems 120 displays the advertisements when the mobile advertisement delivery systems 120 is positioned in a region specified by the advertisement delivery location information and during the advertisement delivery time period.

In certain embodiments, the mobile advertisement system 10 includes a mobile advertisement database 104. The mobile advertisement database 104 is connected to the mobile advertisement server 102. The mobile advertisement database 104 stores at least: advertiser information, subscriber information, and advertisement information. The advertiser information includes contact information and financial information of each of the advertisers. The subscriber information includes contact information, financial information, information of the mobile advertisement delivery system 120 that corresponds to the subscriber, and current GPS location information for each of the subscribers. The current GPS location information for each of the subscribers is updated periodically in real-time through the network 110. The advertisement information may include advertisement content, advertisement delivery instructions, and delivery confirmation for each of the advertisements.

In certain embodiments, each of the mobile advertisement delivery systems 120 includes a universal serial bus (USB) interface for retrieving one or more local advertisements and their corresponding local delivery instructions when the local advertisements and the local delivery instructions are available. Each of the local advertisements includes: one or more banners, one or more digital images, one or more messages in text form, one or more animations, and one or more videos. Each of the local delivery instructions corresponds to one of the local advertisements, and each of the local delivery instructions includes: a local advertisement delivery time period and a local advertisement delivery location information. The mobile advertisement display device 128 displays the local advertisements when the mobile advertisement delivery system 120 is positioned in the region specified by the local advertisement delivery location information and during the local advertisement delivery time period.

Figure 2:
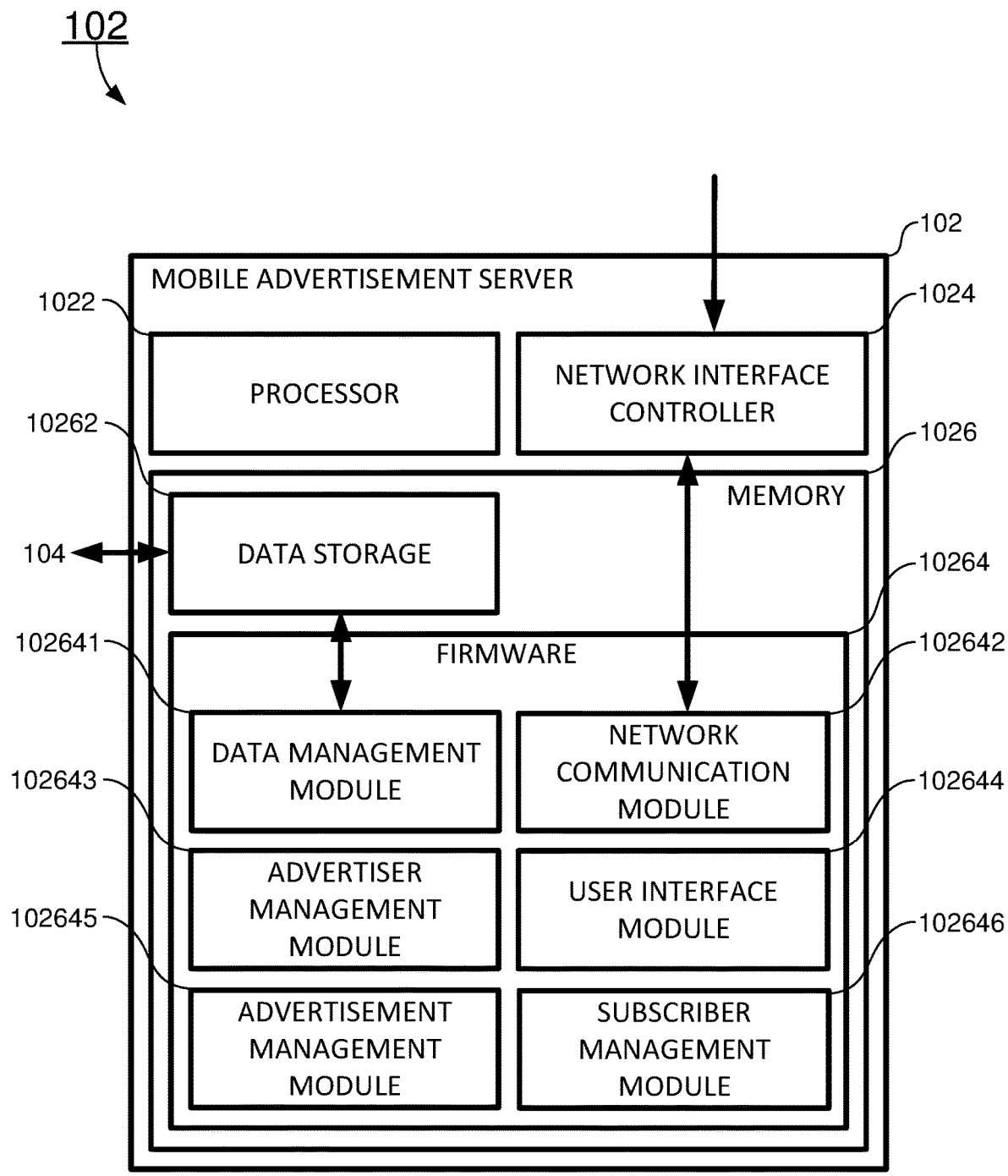
FIG. 2 shows a block diagram of a mobile advertisement server of the mobile advertisement system according to certain embodiments of the present disclosure.

Referring now to FIG. 2, a block diagram of a mobile advertisement server 102 is shown according to certain embodiments of the present disclosure. In certain embodiments, the mobile advertisement server 102 includes a processor 1022, a network interface controller 1024, and a memory 1026 having a data storage 10262, and a firmware 10264 storing computer executable instructions. The network interface controller 1024 is used to establish and maintain network communication of the mobile advertisement server 102 with all mobile advertisement delivery systems 120 connected through the network 110. The data storage 10262 stores all advertiser information, subscriber information and advertisement information locally for the mobile advertisement server 102. The firmware 10264 includes: a data management module 102641, a network communication module 102642, an advertiser management module 102643, a user interface module 102644, an advertisement management module 102645, and a subscriber management module 102646.

In certain embodiments, the computer executable instructions in the user interface module 102646 and the advertiser management module 102643 allow one or more advertisers to register and store the advertiser information through the data management module 102641 to the data storage 10262 and the mobile advertisement database 104.

The computer executable instructions in the user interface module 102646 and the subscriber management module 102646 allow one or more subscribers to register and store the subscriber information through the data management module 102641 to the data storage 10262 and the mobile advertisement database 104.

The computer executable instructions in the data management module 102641 and the advertisement management module 102645 cause the processor 1022 to receive the advertisements and the delivery instructions and store advertisement information through the data management module 102641 to the data storage 10262 and the mobile advertisement database 104.

The computer executable instructions in the network communication module 102642 and the network interface controller 1024 of the mobile advertisement server 102 cause the processor 1022 to receive GPS location updates in the predetermined interval from each of the mobile advertisement delivery systems 120 and store the GPS location updates through the data management module 102641 to the data storage 10262 and the mobile advertisement database 104.

The computer executable instructions in the data management module 102641 and the advertisement management module 102645 cause the processor 1022 to dispatch via the network communication module 102642, the network interface controller 1024 and the network 110, the advertisements and the delivery instructions to each of the mobile advertisement delivery systems 120 operating in the region specified by the advertisement delivery location information and during the advertisement delivery time period. In certain embodiments, each of the advertisements includes: one or more banners, one or more digital images, one or more messages in text form, one or more animations, and one or more videos. Each of the delivery instructions corresponds to one of the advertisements, and each of the delivery instructions includes: an advertisement delivery time period and an advertisement delivery location information. Each of the mobile advertisement delivery systems 120 displays the advertisements when the mobile advertisement delivery system 120 is positioned in a region specified by the advertisement delivery location information and during the advertisement delivery time period.

The computer executable instructions in the network communication module 102642 and the network interface controller 1024 cause the processor 1022 to receive via the network 110, delivery confirmations from each of the mobile advertisement delivery systems 120 after one or more advertisements are displayed according to the corresponding delivery instructions.

The delivery confirmation for each of the advertisements includes: the time of display of the advertisement; the location of display of the advertisement; and total number of displays of the advertisement. In one embodiment, the delivery confirmation may be used to account for the final results of the advertisements delivered so the mobile advertisement system 10 may use the delivery confirmation to charge the advertisers.

Figure 3:
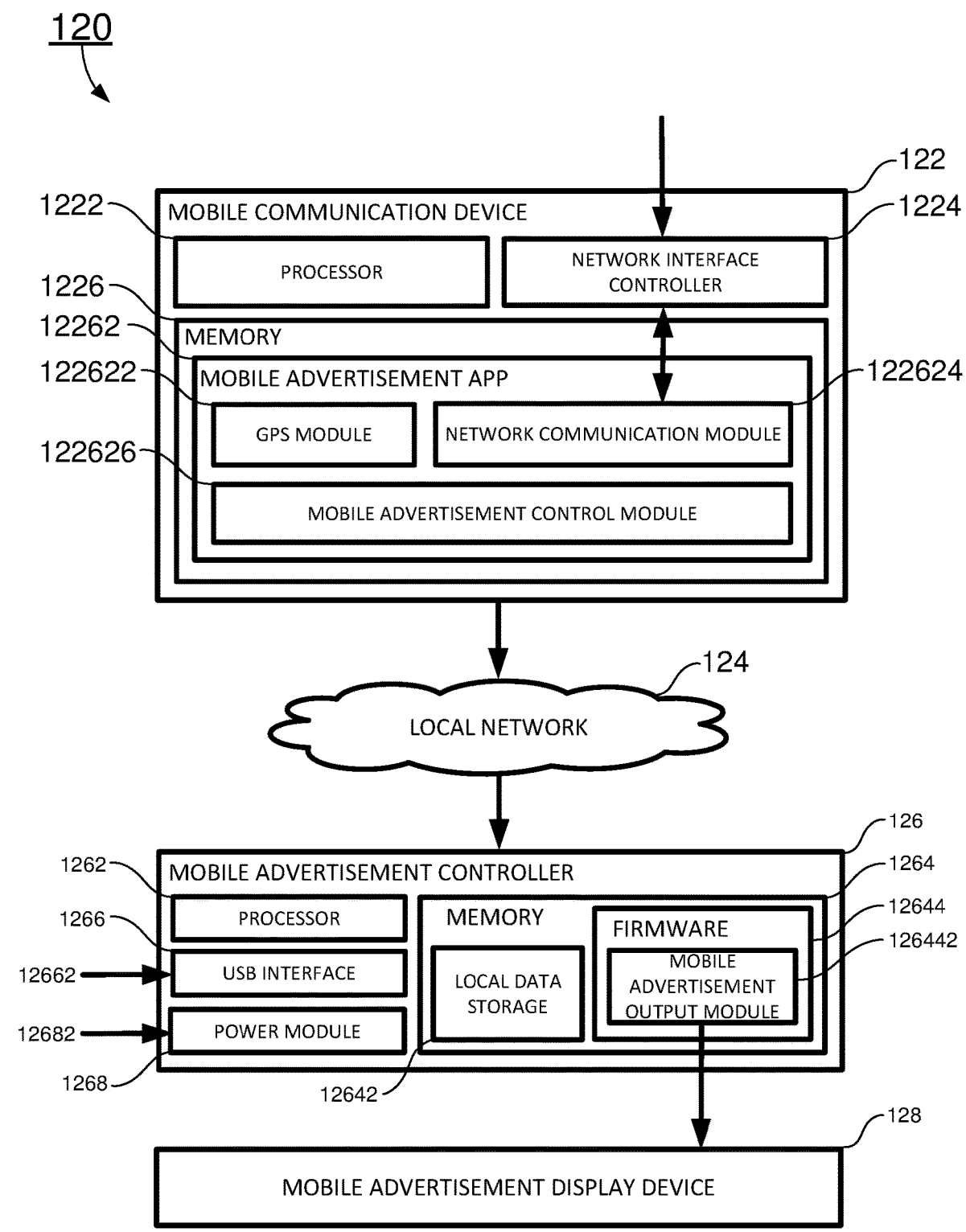
FIG. 3 shows a block diagram of a first mobile advertisement deliver system of the mobile advertisement system according to one embodiment of the present disclosure.

Referring now to FIG. 3, a block diagram of a first mobile advertisement deliver system 120 of the mobile advertisement system 10 is shown according to one embodiment of the present disclosure. In this embodiment, the mobile advertisement deliver system 120 includes a mobile communication device 122, a mobile advertisement controller 126, and the mobile advertisement display device 128. The mobile communication device 122 is a bridge between the mobile advertisement controller 126 and the mobile advertisement server 102.

In certain embodiments, the mobile communication device 122 includes a processor 1222, a network interface controller 1224, and a memory 1226. The memory 1226 includes a mobile advertisement application 12262. The mobile advertisement application 12262 includes a GPS module 122622, a network communication module 122624, and a mobile advertisement control module 122626. The GPS module 122622 detects the GPS location information of the mobile advertisement deliver system 120. The network communication module 122624 establishes and maintains communication between the mobile advertisement application 12262 and the mobile advertisement deliver system 120 and the mobile advertisement server 102 through the network interface controller 1224 and the network 110. The mobile advertisement control module 122626 stores computer executable instructions, when these computer executable instructions are executed by the processor 1222, these computer executable instructions cause the processor 1222 to: send GPS location updates of the mobile advertisement delivery systems 120 to the mobile advertisement server 102 over the network 110, receive the advertisements and the delivery instructions from the mobile advertisement server 102 in response to the GPS location updates sent, send the advertisements and the delivery instructions received to the mobile advertisement controller 126 over a local network 124, instruct the mobile advertisement controller 126 to send the advertisements and the delivery instructions to the mobile advertisement display device 128, instruct the mobile advertisement display device 128 to display the advertisements according to the delivery instructions, and send delivery confirmations to the mobile advertisement server 102 when one or more advertisements are displayed.

The local network 124 may include an HDMI cable, a RCA cable, a video cable, a Wi-Fi network, a Bluetooth network, and any other wired or wireless networks.

In certain embodiments, the mobile advertisement controller 126 of the mobile advertisement delivery system 120 includes a processor 1262, and a memory 1264 having a local data storage 12642 for storing the advertisements and the delivery instructions, and a firmware 12644 storing computer executable instructions. When executed by the processor 1262, the computer executable instructions cause the processor 1262 to perform: receiving the advertisements and the delivery instructions from the mobile communication device 122, storing the advertisements and the delivery instructions received in the local data storage 12642, sending the advertisements and the delivery instructions to the mobile advertisement display device 128 through a mobile advertisement output module 126442, and instructing the mobile advertisement display device 128 to display the advertisements according to the delivery instructions.

In certain embodiments, the computer executable instructions in the network communication module 122624 and the network interface controller 1224 cause the processor 1222 to send via the network 110, delivery confirmations to the mobile advertisement server 102 after one or more advertisements are displayed according to the corresponding delivery instructions.

The delivery confirmation for each of the advertisements includes: the time of display of the advertisement; the location of display of the advertisement; and total number of displays of the advertisement. In one embodiment, the delivery confirmation may be used to account for the final results of the advertisements delivered so the mobile advertisement system 10 may use the delivery confirmation to charge the advertisers.

In the embodiment as shown in FIG. 3, the mobile advertisement delivery system 120 includes a universal serial bus (USB) interface 1266 for retrieving one or more local advertisements 12662 and their corresponding local delivery instructions when the local advertisements 12662 and the local delivery instructions are available. In certain embodiments, when executed by the processor 1262, the computer executable instructions cause the processor 1262 to perform: retrieving one or more local advertisements 12662 and corresponding local delivery instructions through the USB interface 1266 when the local advertisements 12662 and the local delivery instructions are available, storing the local advertisements 12662 and the local delivery instructions retrieved in the local data storage 12642, sending the local advertisements 12662 and the local delivery instructions to the mobile advertisement display device 128, and instructing the mobile advertisement display device 128 to display the local advertisements 12662 according to the delivery instructions. Each of the local delivery instructions corresponds to one of the local advertisements. Each of the local delivery instructions includes: a local advertisement delivery time period and a local advertisement delivery location information. The mobile advertisement display device 128 displays the local advertisements 12662 when the mobile advertisement delivery system 120 is positioned in the region specified by the local advertisement delivery location information and during the local advertisement delivery time period.

The mobile advertisement delivery system 120 includes a power module 12662. The power module 12662 indicates the mobile advertisement delivery system 120 is powered on when a power input 126622 is connected to and switched on to a power supply. The power input 122622 may include a regular 120V alternate current (AC) power supply, or a 12 V direct current (DC) power supply as often available on automobiles.

Figure 4:
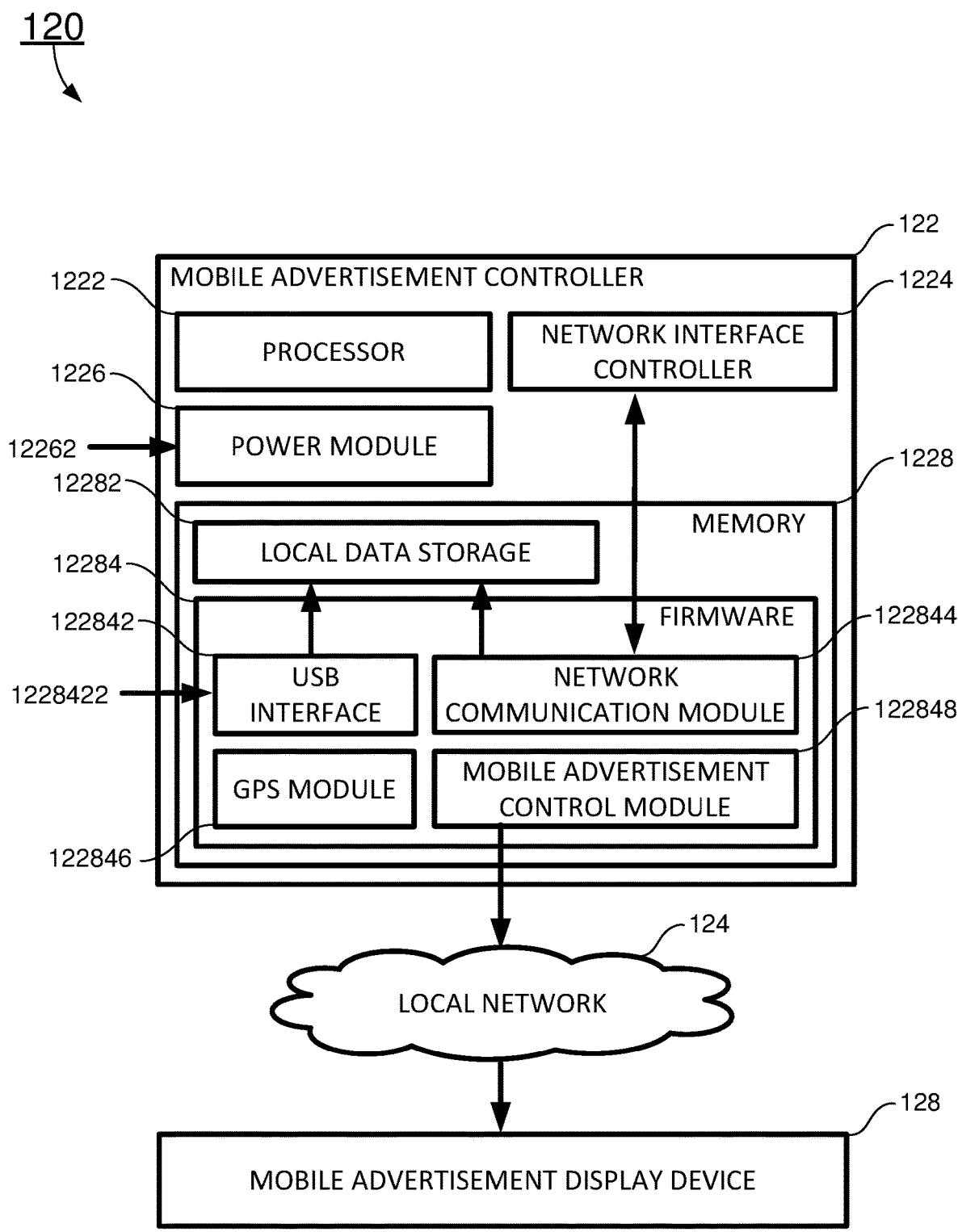
FIG. 4 shows a block diagram of a second mobile advertisement deliver system of the mobile advertisement system according to another embodiment of the present disclosure.

Referring now to FIG. 4, a block diagram of a second mobile advertisement deliver system 120 of the mobile advertisement system 10 is shown according to another embodiment of the present disclosure. In this embodiment, the mobile advertisement deliver system 120 includes a mobile advertisement controller 122, and the mobile advertisement display device 128.

In certain embodiments, each of the mobile advertisement delivery system 120 includes: a mobile advertisement controller 122, and the mobile advertisement display device 128. The mobile advertisement controller 122 has a processor 1222, a network interface controller 1224, a power module 1226 and a memory 1228. The memory 1228 includes a local data storage 12282 for storing the advertisements and the delivery instructions, and a firmware 12284 for storing computer executable instructions. When executed by the processor 1222, the computer executable instructions cause the processor 1222 to perform: sending GPS location updates of the mobile advertisement controller 122 in the predetermined interval to the mobile advertisement server 102 over the network 110, receiving the advertisements and the delivery instructions from the mobile advertisement server 102 in response to the GPS location updates sent, storing the advertisements and the delivery instructions received in the local data storage 12282, displaying the advertisements on the mobile advertisement display device 128 according to the delivery instructions over a local network 124, and sending delivery confirmations to the mobile advertisement server 102 when one or more advertisements are displayed.

The local network 124 may include an HDMI cable, a RCA cable, a video cable, a Wi-Fi network, a Bluetooth network, and any other wired or wireless networks.

The computer executable instructions in the network communication module 122844 and the network interface controller 1224 cause the processor 1222 to send via the network 110, delivery confirmations to the mobile advertisement server 102 after one or more advertisements are displayed according to the corresponding delivery instructions.

The delivery confirmation for each of the advertisements includes: the time of display of the advertisement; the location of display of the advertisement; and total number of displays of the advertisement. In one embodiment, the delivery confirmation may be used to account for the final results of the advertisements delivered so the mobile advertisement system 10 may use the delivery confirmation to charge the advertisers.

In certain embodiments, when executed by the processor 1222, the computer executable instructions cause the processor 1222 to perform: retrieving one or more local advertisements 1228422 and corresponding local delivery instructions through a USB interface 122842 when the local advertisements 1228422 and the local delivery instructions are available, storing the local advertisements 1228422 and the local delivery instructions retrieved in the local data storage 12282, sending the local advertisements 1228422 and the local delivery instructions to the mobile advertisement display device 128 over the local network 124, and displaying the local advertisements 1228422 on the mobile advertisement display device 128 according to the local delivery instructions. Each of the local delivery instructions corresponds to one of the local advertisements 1228422.

In certain embodiments, each of the local advertisements 1228422 include: one or more banners, one or more digital images, one or more messages in text form, one or more animations, and one or more videos. Each of the local delivery instructions includes: a local advertisement delivery time period and a local advertisement delivery location information. The mobile advertisement display device 128 displays the local advertisements 1228422 when the mobile advertisement delivery system 120 is positioned in the region specified by the local advertisement delivery location information and during the local advertisement delivery time period.

The mobile advertisement delivery system 120 includes a power module 1226. The power module 1226 indicates the mobile advertisement delivery system 120 is powered on when a power input 1362 is connected to and switched on to a power supply. The power input 12262 may include a regular 120V alternate current (AC) power supply, or a 12 V direct current (DC) power supply as often available on automobiles.

In certain embodiments, the mobile advertisement display device 128 of the mobile advertisement delivery system 120 as shown in FIGS. 3 and 4 includes: an image projector, a video projector, a laser image projector, a light-emitting diode (LED) display screen, an organic light-emitting diode (OLED) display screen, and a liquid crystal display (LCD) screen.

In certain embodiments, when the mobile advertisement delivery system 120 is mounted on an automobile, the mobile advertisement display device 128 of the mobile advertisement delivery system 120 includes an image projector, a video projector, a laser image projector. These projectors project images and videos on back window and/or side windows of the automobile. In certain embodiments, the projector may be mounted on either side or both sides of the rearview mirrors to project images and/or videos either or both side doors. In certain embodiments, the mobile advertisement display device 128 may be mount on or near rear bumper of a moving vehicle such that the advertisements may be displayed/projected on the road such that the projected/displayed advertisements may be seen by the people in vehicles behind it.

In certain embodiments, the mobile advertisement display device 128 may include an LED display screen and an LCD display screen mounted inside of the automobile, or embedded within the back window glass, or the side window glass. In certain embodiments, the mobile advertisement display device 128 may include an OLED display screen. The OLED display screen may be mounted on the back window, side windows, the body of the automobile including the front and/or rear bumpers, the back door/trunk door, or anywhere on the body of the automobile.

Figure 5:
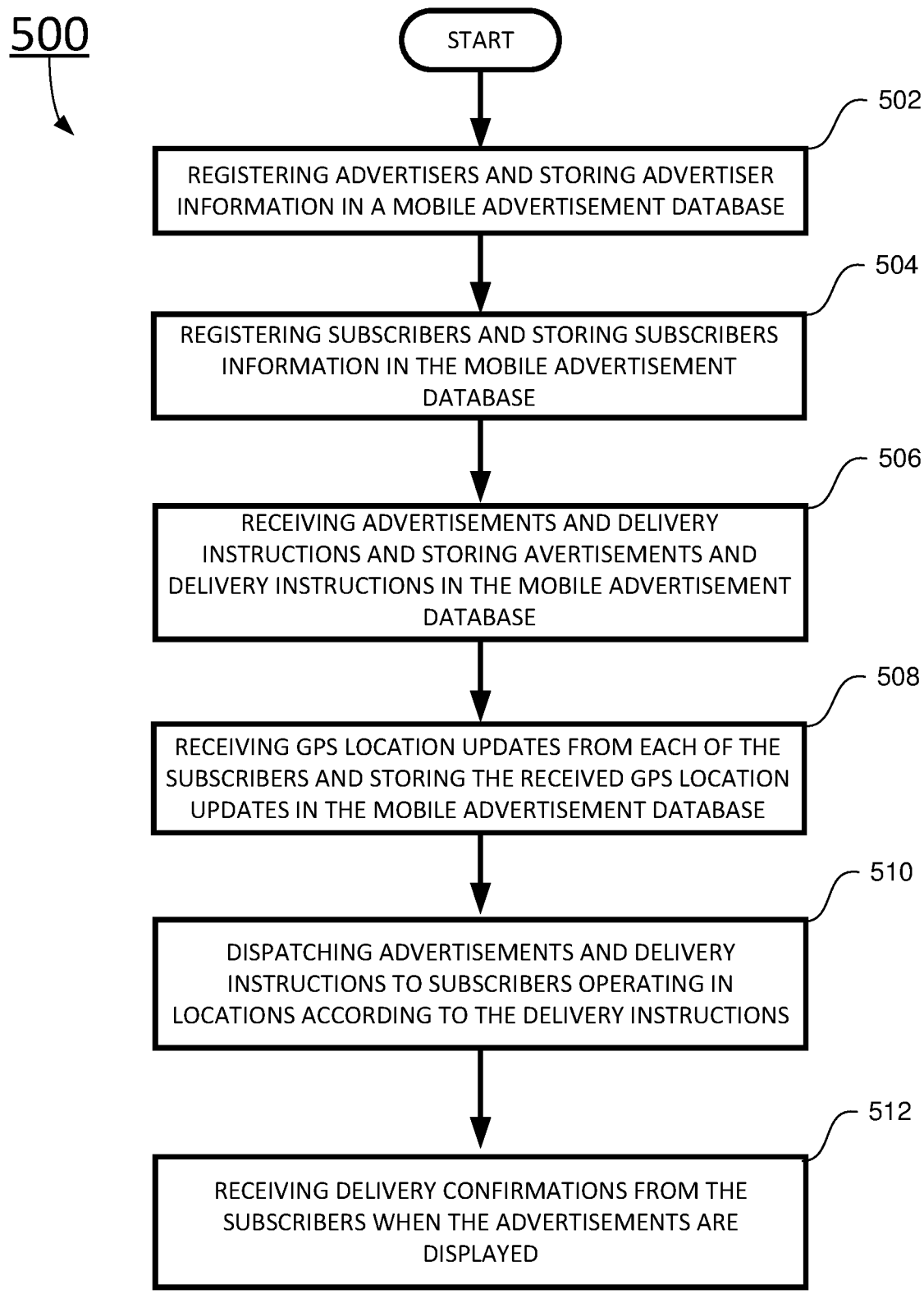
FIG. 5 shows a flow chart of a method of using the mobile advertisement server according to certain embodiments of the present disclosure.

Referring now to FIG. 5, in another aspect the present disclosure relates to a method 500 of using the mobile advertisement server 102 as shown according to certain embodiments of the present disclosure.

At block 502, one or more advertisers may establish network communication to the mobile advertisement server 102 using a regular computer and register each of the advertisers. Registering advertisers may include: entering, by each of the advertisers, contact information, and financial information such that the mobile advertisement system 10 can use this information to do business with each of the advertisers. The contact information and financial information is stored in a secure mobile advertisement database 104 and a data storage 10262 of the mobile advertisement server 102.

The network interface controller 1024, the network communication module 102642, the advertiser management module 102643 and the data management module 102641 of the mobile advertisement server 102 are used for registering the advertisers. The advertisers may be added to the mobile advertisement system 10 at any time.

At block 504, one or more mobile advertisement participants using mobile advertisement delivery systems 120, or also known as subscribers may establish network communication to the mobile advertisement server 102 using a regular computer or through the mobile advertisement delivery system 120 and register each of the subscribers. Each of the subscribers corresponds to at least one of the mobile advertisement delivery systems 120.

In certain embodiments, registering subscribers may include: entering, by each of the subscribers, contact information, financial information, information of the mobile advertisement delivery system 120 that corresponds to the subscriber, and current GPS location information for each of the subscribers such that the mobile advertisement system 10 can use this information to dispatch advertisements and delivery instructions to each of the mobile advertisement delivery system 120 to allow each of the subscribers to display advertisements according to the delivery instructions received, and provide compensations to each of the subscribers. The current GPS location information for each of the subscribers is updated periodically in real-time through the network 110. The contact information, financial information, the mobile advertisement delivery system 120 information and the current GPS location information are stored in the secure mobile advertisement database 104 and the data storage 10262 of the mobile advertisement server 102.

The network interface controller 1024, the network communication module 102642, the subscriber management module 102646 and the data management module 102641 of the mobile advertisement server 102 are used for registering the subscribers. The subscribers may be added to the mobile advertisement system 10 at any time.

At block 506, the registered advertisers may establish network communication to the mobile advertisement server 102 using a regular computer and send one or more advertisements and their corresponding delivery instructions to the mobile advertisement server 102.

In certain embodiments, each of the advertisements includes: one or more banners, one or more digital images, one or more messages in text form, one or more animations, and one or more videos. Each of the delivery instructions corresponds to one of the advertisements, and each of the delivery instructions includes: an advertisement delivery time period and an advertisement delivery location information.

The network interface controller 1024, the network communication module 102642, the advertisement management module 102645 and the data management module 102641 of the mobile advertisement server 102 are used for receiving the advertisements and the corresponding delivery instructions from each of the advertisers. The advertisements and the corresponding delivery instructions may be provided to the mobile advertisement system 10 at any time.

At block 508, the mobile advertisement server 102 receives GPS location updates from each of the mobile advertisement delivery system 120 in a predetermined interval. For example, the mobile advertisement server 102 receives GPS location updates from each of the mobile advertisement delivery system 120 every one minute, or every five minutes. The mobile advertisement server 102 stores the GPS location updates from each of the mobile advertisement delivery system 120 in the secure mobile advertisement database 104 and the data storage 10262 of the mobile advertisement server 102.

In certain embodiments, the GPS location updates from each of the mobile advertisement delivery system 120 may be provided to the mobile advertisement server 102 at any time. In one embodiment, the mobile advertisement delivery system 120 may send out GPS location updates when the vehicle carrying the mobile advertisement delivery system 120 moves away from the current GPS location a predetermined distance, for example, a mile, or three miles.

The network interface controller 1024, the network communication module 102642, the subscriber management module 102646 and the data management module 102641 of the mobile advertisement server 102 are used for receiving the GPS location updates from each of the mobile advertisement delivery system 120.

At block 510, in response to the GPS location updates received, the mobile advertisement server 102 dispatches the advertisements and the delivery instructions to the mobile advertisement delivery systems 120 sending the GPS location updates and operating in the region specified by the advertisement delivery location information and during the advertisement delivery time period.

In certain embodiments, the mobile advertisement server 102 dispatches one or more advertisements for the mobile advertisement delivery system 120 sending the GPS location updates only when the GPS location updates indicate a location located in a predetermined distance, for example, a mile, from the current GPS location, such that the data traffic between the mobile advertisement server 102 and the mobile advertisement delivery system 120 may be reduced.

In certain embodiments, the dispatching includes: sorting the advertisements according to a start time of the advertisement delivery time period indicated in the delivery instructions, going through each of the advertisements prior to the start time of each of the advertisements, searching for a group of mobile advertisement delivery systems 120 currently located in the region specified by the advertisement delivery location information of the delivery instruction of the advertisement, and dispatching the advertisement to the group of mobile advertisement delivery systems 120 currently located in the region.

In one embodiment, the mobile advertisement server 102 dispatches the advertisements and the delivery instructions to the mobile advertisement delivery systems 120 only when the mobile advertisement delivery systems 120 moves away from the current GPS location a predetermined distance, for example, a mile, or three miles. In another embodiment, the mobile advertisement server 102 dispatches the advertisements and the delivery instructions to the mobile advertisement delivery systems 120 only when the mobile advertisement server 102 receives one or more new advertisements to be delivered in or around the current GPS location.

The network interface controller 1024, the network communication module 102642, the advertisement management module 102645 and the data management module 102641 of the mobile advertisement server 102 are used for dispatching the advertisements and their corresponding delivery instructions.

At block 512, the mobile advertisement server 102 receives delivery confirmations from each of the mobile advertisement delivery system 120 when each of the mobile advertisement delivery system 120 displays one or more of the advertisements received by the mobile advertisement delivery system 120.

The delivery confirmation for each of the advertisements includes: the time of display of the advertisement; the location of display of the advertisement; and total number of displays of the advertisement. In one embodiment, the delivery confirmation may be used to account for the final results of the advertisements delivered so the mobile advertisement system 10 may use the delivery confirmation to charge the advertisers. The received delivery confirmations are stored in the secure mobile advertisement database 104 and the data storage 10262 of the mobile advertisement server 102.

The network interface controller 1024, the network communication module 102642, the subscriber management module 102646, the advertisement management module 102645 and the data management module 102641 of the mobile advertisement server 102 are used for receiving the delivery confirmations from each of the mobile advertisement delivery system 120.

Figure 6:
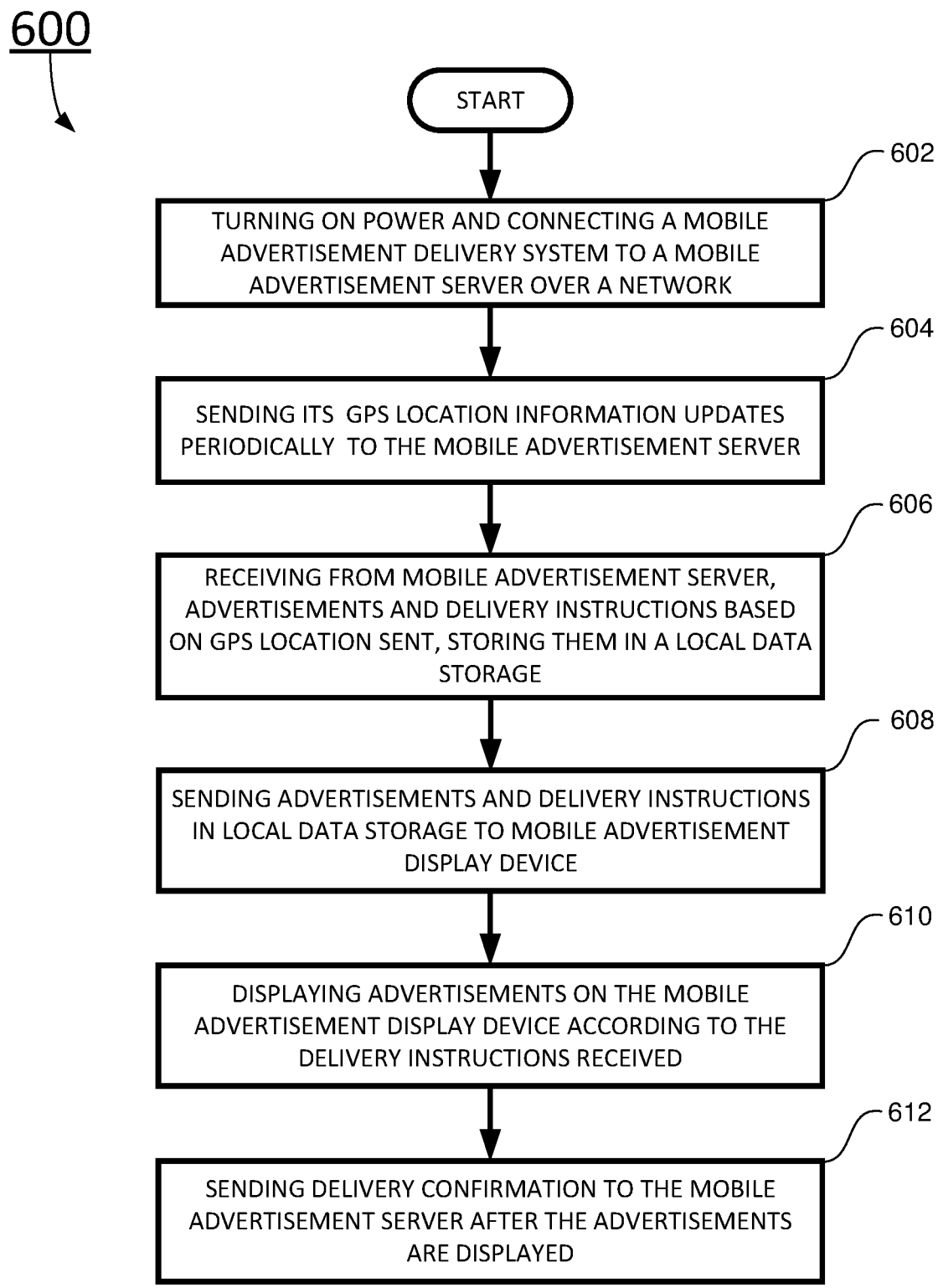
FIG. 6 shows a flow chart of a method of mobile advertisement using the mobile advertisement delivery system according to certain embodiments of the present disclosure.

In yet another aspect, the present disclosure related to a method 600 of using the mobile advertisement delivery system 120 to display advertisements. A flow chart of the method 600 is shown in FIG. 6 according to certain embodiments of the present disclosure.

At block 602, when a user turns on a vehicle, a power module of the mobile advertisement delivery system 120 is turned on and the mobile advertisement delivery system 120 establishes network communication through a network interface controller and a network communication module of the mobile advertisement delivery system 120 between the mobile advertisement delivery system 120 to a mobile advertisement server 102 over a network 110.

At block 604, the mobile advertisement delivery system 120 sends GPS location updates of the mobile advertisement delivery system 120 to the mobile advertisement server 102 in a predetermined interval over the network 110. In certain embodiments, the mobile advertisement delivery system 120 may send out GPS location updates to the mobile advertisement server 102 at any time. In one embodiment, the mobile advertisement delivery system 120 may send out GPS location updates when the vehicle carrying the mobile advertisement delivery system 120 moves away from the current GPS location a predetermined distance, for example, a mile, or three miles.

At block 606, the mobile advertisement delivery system 120 receives one or more advertisements and corresponding delivery instructions from the mobile advertisement server 102 in response to the GPS location updates sent over the network 110. After the mobile advertisement delivery system 120 receives the advertisements and corresponding delivery instructions, these advertisements and corresponding delivery instructions are stored in a local data storage.

In one embodiment, the mobile advertisement server 102 dispatches the advertisements and the delivery instructions to the mobile advertisement delivery systems 120 only when the mobile advertisement delivery systems 120 moves away from the current GPS location a predetermined distance, for example, a mile, or three miles. In another embodiment, the mobile advertisement server 102 dispatches the advertisements and the delivery instructions to the mobile advertisement delivery systems 120 only when the mobile advertisement server 102 receives one or more new advertisements to be delivered in or around the current GPS location.

At block 608, the mobile advertisement server 102 sends the advertisements and the delivery instructions received to a mobile advertisement display device 128 for display. In certain embodiments, each of the advertisements includes: one or more banners, one or more digital images one or more messages in text form one or more animations, and one or more videos. Each of the delivery instructions corresponds to one of the advertisements. Each of the delivery instructions includes: an advertisement delivery time period and an advertisement delivery location information.

At block 610, the mobile advertisement server 102 displays the advertisements on the mobile advertisement display device 128 according to the delivery instructions. The mobile advertisement display device 128 displays the advertisements when the mobile advertisement delivery systems 120 is positioned in the region specified by the advertisement delivery location information and during the advertisement delivery time period.

At block 612, the mobile advertisement server 102 sends a delivery confirmation for each of the advertisements displayed through the mobile advertisement display device 128 back to the mobile advertisement server 102 over the network 110. The delivery confirmation includes at least: the time of display of the advertisement, the location of display of the advertisement, and total number of displays of the advertisement. In one embodiment, the delivery confirmation may be used to account for the final results of the advertisements delivered so the mobile advertisement system 10 may use the delivery confirmation to charge the advertisers. The received delivery confirmations are stored in the secure mobile advertisement database 104 and the data storage 10262 of the mobile advertisement server 102.

In certain embodiments, the method may also include: retrieving one or more local advertisements and corresponding local delivery instructions from a USB interface when the local advertisements and the local delivery instructions are available, storing the local advertisements and the local delivery instructions retrieved in the local data storage, and displaying the local advertisements on the mobile advertisement display device 128 according to the local delivery instructions.

In certain embodiments, each of the local advertisements includes: one or more banners, one or more digital images one or more messages in text form one or more animations, and one or more videos. Each of the local delivery instructions corresponds to one of the local advertisements. Each of the local delivery instructions includes: a local advertisement delivery time period and a local advertisement delivery location information. The mobile advertisement display device 128 displays the local advertisements when the mobile advertisement delivery systems 120 is positioned in the region specified by the local advertisement delivery location information and during the local advertisement delivery time period.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims, the foregoing description and the exemplary embodiments described therein, and accompanying drawings.

What is claimed is:

1. A mobile advertisement platform, comprising:
   a mobile advertisement server for receiving registrations from a plurality of advertisers, and a plurality of subscribers, receiving a plurality of advertisements and a plurality of delivery instructions from the plurality of advertisers, receiving Global Positioning System (GPS) location information in a predetermined interval from each of the plurality of subscribers, and dynamically providing the plurality of advertisements and the plurality of delivery instructions to the plurality of subscribers through a network; and
   a plurality of mobile advertisement delivery systems, wherein each of the plurality of mobile advertisement delivery systems is mounted in a traveling vehicle driven by one of the plurality of subscribers to broadcast the plurality of advertisements according to the plurality of delivery instructions to people around the traveling vehicle carrying the mobile advertisement delivery system,
   wherein each of the plurality of mobile advertisement delivery systems comprises:

a mobile advertisement display device for displaying the plurality of advertisements according to the plurality of delivery instructions to people around the traveling vehicle carrying the mobile advertisement display device, wherein the plurality of advertisements and the plurality of delivery instructions are received from a mobile advertisement controller from the mobile advertisement server remotely over the network, and transmitted to the mobile advertisement display device through a local network; and a mobile advertisement controller having a processor, and a memory wherein the memory comprises a local data storage for storing the plurality of advertisements and the plurality of delivery instructions, and a firmware having a GPS module to detect the GPS location of the traveling vehicle carrying the mobile advertisement delivery system, and storing computer executable instructions, when executed by the processor, the computer executable instructions cause the processor to:

detect, via the GPS module of the mobile advertisement controller, the GPS location information of the traveling vehicle carrying the mobile advertisement delivery system;

transmit the GPS location information of the traveling vehicle carrying the mobile advertisement delivery system detected by the GPS module to the mobile advertisement server over the network;

receive dynamically the plurality of advertisements and the plurality of delivery instructions from the mobile advertisement server based on the GPS location information of the traveling vehicle sent;

store the plurality of advertisements and the plurality of delivery instructions received in the local data storage;

broadcast the plurality of advertisements through the mobile advertisement display device on each traveling vehicle to people around the vehicle according to the plurality of delivery instructions; and send confirmation information back to the mobile advertisement server after each of the plurality of advertisements is displayed by the mobile advertisement display device through a mobile communication device over the network, wherein the confirmation information comprises: the time of the delivery of each of the plurality of advertisements; the location of the delivery of each of the plurality of advertisements, and total time of the delivery of each of the plurality of advertisements, and the confirmation information is used to account for final results of the advertisement display and to enable fair compensations for the advertisement display.

2. The mobile advertisement platform of claim 1, wherein the plurality of advertisements comprises:
a plurality of banners;
a plurality of digital images;
a plurality of messages in text form;
a plurality of animations;
a plurality of videos; and
one or more amber alerts.

3. The mobile advertisement platform of claim 1, wherein each of the plurality of delivery instructions corresponds to one of the plurality of advertisements, and each of the plurality of delivery instructions comprises: a first time period and a first location information, wherein the mobile advertisement display device displays the plurality of advertisements when the mobile advertisement delivery system is positioned in the region specified by the first location information and during the first time period.

4. The mobile advertisement platform of claim 1, wherein the mobile communication device transmits the GPS location information of the traveling vehicle carrying the mobile advertisement delivery system detected by the GPS module to the mobile advertisement server over the network, receives the plurality of advertisements and the plurality of delivery instructions from the mobile advertisement server, and transmits the plurality of advertisements and the plurality of delivery instructions received to the mobile advertisement controller over the local network.

5. The mobile advertisement platform of claim 1, wherein when executed by the processor, the computer executable instructions in the firmware cause the processor to:
retrieve a plurality of local advertisements and a plurality of local delivery instructions through a USB interface when the plurality of local advertisements and the plurality of local delivery instructions are available;
store the plurality of local advertisements and the plurality of local delivery instructions retrieved in the local data storage; and
display the plurality of local advertisements through the mobile advertisement display device according to the plurality of local delivery instructions over the local network.

6. The mobile advertisement platform of claim 5, wherein the plurality of local advertisements comprises:
a plurality of banners;
a plurality of digital images;
a plurality of messages in text form;
a plurality of animations; and
a plurality of videos.

7. The mobile advertisement platform of claim 5, wherein each of the plurality of local delivery instructions corresponds to one of the plurality of local advertisements, and each of the plurality of local delivery instructions comprises: a second time period and a second location information, wherein the mobile advertisement display device displays the plurality of local advertisements when the mobile advertisement delivery system is positioned in the region specified by the second location information and during the second time period.

8. The mobile advertisement platform of claim 1, wherein the mobile advertisement display device comprises:
an image projector;
a video projector;
a laser image projector;
a light-emitting diode (LED) display screen;
an organic light-emitting diode (OLED) display screen;
a liquid crystal display (LCD) screen, and
a combination thereof.

9. A method of using a mobile advertisement platform, comprising:
registering, by a plurality of advertisers, the plurality of advertisers through a mobile advertisement server of the mobile advertisement platform over a network; and
registering, by a plurality of subscribers through the mobile advertisement server of the mobile advertisement platform over the network;
establishing, by a mobile communication device of each of a plurality of mobile advertisement delivery systems of the mobile advertisement platform, network communication over the network to the mobile advertisement server, wherein each of the plurality of mobile advertisement delivery systems is mounted in a traveling vehicle to display a plurality of advertisements according to a plurality of delivery instructions;

detecting, via a Global Positioning System (GPS) module of the mobile advertisement controller, GPS location information of the traveling vehicle carrying the mobile advertisement delivery system in real time;

sending, via the mobile communication device, the GPS location information of the traveling vehicle carrying the mobile advertisement delivery system detected by the GPS module to the mobile advertisement server;

sending, by the mobile advertisement server, dynamically, the plurality of advertisements and the plurality of delivery instructions to the mobile advertisement delivery system while the vehicle is traveling based on the GPS location information received;

receiving, dynamically, by the mobile communication device, the plurality of advertisements and the plurality of delivery instructions from the mobile advertisement server;

storing, by the mobile advertisement controller, the plurality of advertisements and the plurality of delivery instructions received in a local data storage;

displaying, by a mobile advertisement display device, the plurality of advertisements according to the plurality of delivery instructions to people around the traveling vehicle through a local network; and sending, by the mobile communication device, confirmation information back to the mobile advertisement server after each of the plurality of advertisements is displayed by the mobile advertisement display device over the network, wherein the confirmation information comprises: the time of the delivery of each of the plurality of advertisements; the location of the delivery of each of the plurality of advertisements, and total time of the delivery of each of the plurality of advertisements, and the confirmation information is used to account for final results of the advertisement display and to enable fair compensations for the advertisement display.

10. The method of claim 9, wherein the plurality of advertisements comprises:
a plurality of banners;
a plurality of digital images;
a plurality of messages in text form;
a plurality of animations;
a plurality of videos; and
one or more amber alerts.

11. The method of claim 9, wherein the mobile advertisement display device comprises:
an image projector;
a video projector;
a laser image projector;
a light-emitting diode (LED) display screen;
an organic light-emitting diode (OLED) display screen;
a liquid crystal display (LCD) screen, and
a combination thereof.

12. The method of claim 9, wherein each of the plurality of delivery instructions corresponds to one of the plurality of advertisements, and each of the plurality of delivery instructions comprises: a first time period and a first location information, wherein the mobile advertisement display device displays the plurality of advertisements when the mobile advertisement delivery system is positioned in the region specified by the first location information and during the first time period.

13. The method of claim 9, further comprising:
retrieving, by the mobile advertisement controller, a plurality of local advertisements and a plurality of local delivery instructions from a USB interface when the plurality of local advertisements and the plurality of local delivery instructions are available;

storing, by the USB interface, the plurality of local advertisements and the plurality of local delivery instructions retrieved in the local data storage; and sending, by the mobile advertisement controller, the plurality of local advertisements over the local network for display on the mobile advertisement display device according to the plurality of local delivery instructions.

14. The method of claim 13, wherein each of the plurality of local delivery instructions corresponds to one of the plurality of local advertisements, and each of the plurality of local delivery instructions comprises: a second time period and a second location information, wherein the mobile advertisement display device displays the plurality of local advertisements when the mobile advertisement delivery system is positioned in the region specified by the second location information and during the second time period.

15. The method of claim 9, wherein the plurality of local advertisements comprises:
a plurality of banners;
a plurality of digital images;
a plurality of messages in text form;
a plurality of animations; and
a plurality of videos.

16. A non-transitory computer storage medium having computer-executable instructions stored thereon which, when executed by a processor of a mobile advertisement controller of a mobile advertisement delivery system, cause the processor to:

register, by a plurality of advertisers, the plurality of advertisers through a mobile advertisement server of the mobile advertisement platform over a network; and
register, by a plurality of subscribers through the mobile advertisement server of the mobile advertisement platform over the network;

establish, by a mobile communication device of each of a plurality of mobile advertisement delivery systems of the mobile advertisement platform, network communication over the network to the mobile advertisement server, wherein each of the plurality of mobile advertisement delivery systems is mounted in a traveling vehicle to display a plurality of advertisements according to a plurality of delivery instructions;

detect, via a Global Positioning System (GPS) module of the mobile advertisement controller of the mobile advertisement delivery system, GPS location information of the mobile advertisement delivery system in real time, wherein the mobile advertisement delivery system is mounted in a traveling vehicle to display a plurality of advertisements according to a plurality of delivery instructions;

send the GPS location information of the traveling vehicle carrying the mobile advertisement delivery system to a mobile advertisement server through a mobile communication device over a network;

receive, dynamically the plurality of advertisements and the plurality of delivery instructions from the mobile advertisement server based on the GPS location information of the traveling vehicle sent;

store the plurality of advertisements and the plurality of delivery instructions received in a local data storage of the mobile advertisement controller;

display the plurality of advertisements to a mobile advertisement display device according to the plurality of delivery instructions to people around the traveling vehicle; and send confirmation information back to the mobile advertisement server after each of the plurality of advertisements is displayed by the mobile advertisement display device over the network, wherein the confirmation information comprises: the time of the delivery of each of the plurality of advertisements; the location of the delivery of each of the plurality of advertisements, and total time of the delivery of each of the plurality of advertisements, and the confirmation information is used to account for final results of the advertisement display and to enable fair compensations for the advertisement display.

17. The non-transitory computer storage medium of claim 16, wherein each of the plurality of delivery instructions corresponds to one of the plurality of advertisements, and each of the plurality of delivery instructions comprises: a first time period and a first location information, wherein the mobile advertisement display device displays the plurality of advertisements when the mobile advertisement delivery system is positioned in the region specified by the first location information and during the first time period.

18. The non-transitory computer storage medium of claim 16, wherein when executed by the processor of the mobile advertisement controller, the computer-executable instructions cause the processor to:
retrieve a plurality of local advertisements and a plurality of local delivery instructions from a USB interface of the mobile advertisement controller when the plurality of local advertisements and the plurality of local delivery instructions are available;
store the plurality of local advertisements and the plurality of local delivery instructions retrieved in the local data storage; and
send the plurality of local advertisements over a local network for display on the mobile advertisement display device according to the plurality of local delivery instructions.

19. The non-transitory computer storage medium of claim 18, wherein each of the plurality of local delivery instructions corresponds to one of the plurality of local advertisements, and each of the plurality of local delivery instructions comprises: a second time period and a second location information, wherein the mobile advertisement display device displays the plurality of local advertisements when the mobile advertisement delivery system is positioned in the region specified by the second location information and during the second time period.

20. The non-transitory computer storage medium of claim 16, wherein the mobile advertisement delivery system comprises:
the mobile advertisement display device for displaying the plurality of advertisements according to the plurality of delivery instructions;
the mobile communication device, wherein the mobile communication device transmits the GPS location information of the traveling vehicle carrying the mobile advertisement delivery system detected by the GPS module to the mobile advertisement server over the network, receives the plurality of advertisements and the plurality of delivery instructions from the mobile advertisement server, and transmits the plurality of advertisements and the plurality of delivery instructions received to the mobile advertisement controller over the local network and
the mobile advertisement controller having the processor, and a memory wherein the memory comprises the local data storage for storing the plurality of advertisements and the plurality of delivery instructions, and a firmware storing computer executable instructions, when executed by the processor, the computer executable instructions cause the processor to:
detect, via the GPS module of the mobile advertisement controller of the mobile advertisement delivery system, GPS location information of the mobile advertisement delivery system in real time, wherein the mobile advertisement delivery system is mounted in a traveling vehicle to display the plurality of advertisements according to the plurality of delivery instructions;
send the GPS location information of the traveling vehicle carrying the mobile advertisement controller to the mobile advertisement server through the mobile communication device over the network;
receive, dynamically, the plurality of advertisements and the plurality of delivery instructions from the mobile advertisement server based on the GPS location information of the traveling vehicle sent;
retrieve the plurality of local advertisements and the plurality of local delivery instructions from the USB interface of the mobile advertisement controller;
store the plurality of advertisements and the plurality of delivery instructions, and the plurality of local advertisements and the plurality of local delivery instructions in the local data storage of the mobile advertisement controller;
broadcast the plurality of advertisements to the mobile advertisement display device according to the plurality of delivery instructions, and the plurality of local advertisements to the mobile advertisement display device according to the plurality of corresponding local delivery instructions to people around the traveling vehicle, respectively; and
send confirmation information back to the mobile advertisement server after each of the plurality of advertisements is displayed by the mobile advertisement display device over the network, wherein the confirmation information comprises: the time of the delivery of each of the plurality of advertisements; the location of the delivery of each of the plurality of advertisements, and total time of the delivery of each of the plurality of advertisements, and the confirmation information is used to account for final results of the advertisement display and to enable fair compensations for the advertisement display.

* * * * *